May 16, 1967 H. P. BIRMINGHAM 3,320,584
VEHICLE LATERALLY COMPOUNDED OPTICAL GUIDANCE SYSTEM
Filed March 30, 1965 2 Sheets-Sheet 1

INVENTOR
HENRY P. BIRMINGHAM

BY　*Stanley C Corwin* AGENT
　　*[signature]* ATTORNEY

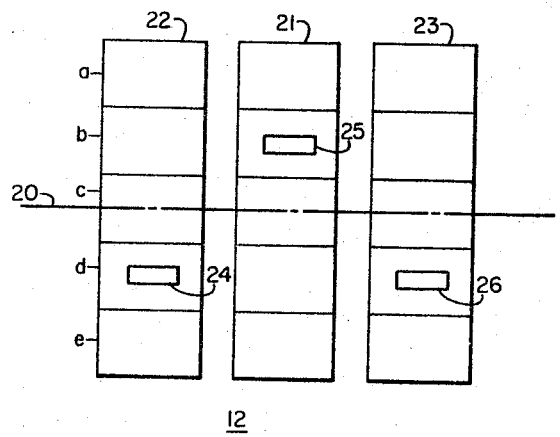
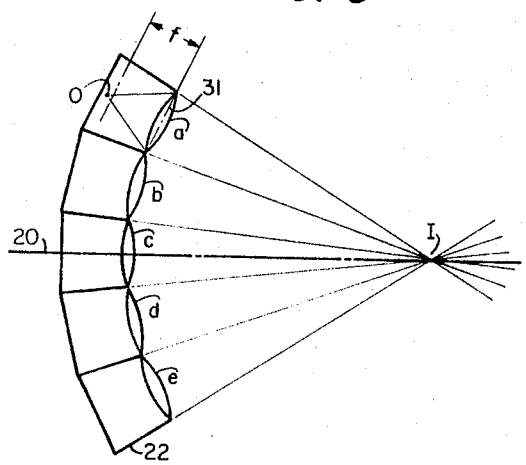
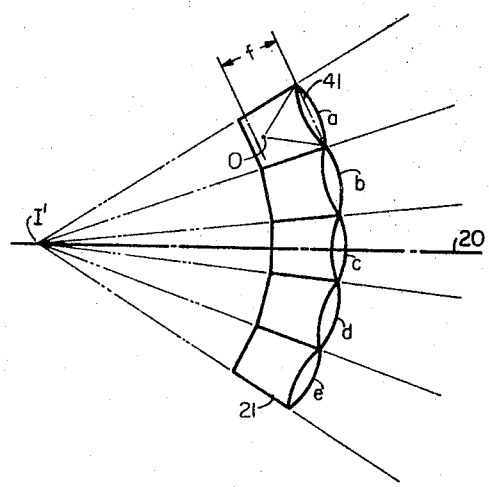

United States Patent Office 3,320,584
Patented May 16, 1967

3,320,584
VEHICLE LATERALLY COMPOUNDED OPTICAL
GUIDANCE SYSTEM
Henry P. Birmingham, Washington, D.C., assignor to the United States of America as represented by the Secretary of the Navy
Filed Mar. 30, 1965, Ser. No. 444,091
9 Claims. (Cl. 340—26)

The invention described herein may be manufactured and used by or for the Government of the United States of America for governmental purposes without the payment of any royalties thereon or therefor.

The present invention relates to an improved optical guidance system, and more particularly to an improved Fresnel lens optical system wherein additional columns of light cells are utilized to increase the amplitude of the indication to a guided vehicle at a given range.

A Fresnel lens optical guidance system of the prior art is set forth and described in detail in U.S. Patent No. 2,991,743, issued to James A. Ogle on July 11, 1961. This system utilizes a single column of light cells so focused and angled to present a single virtual image which appears to be displaced above or below a row of datum lights, indicating the desired path of travel for the vehicle guided, depending upon whether the vehicle is above or below the desired path. While this system is widely used, particularly in the guidance of aircraft for short field landings such as aircraft carrier landings and has proved invaluable as an aid in landing, it has not proved to have the display sensitivity desired to be entirely satisfactory for use with the increased landing speeds of present day aircraft. For example, the indication of error from glide path provided by the single light observed by the pilot to move with respect to the datum lights is so small at the prescribed one mile minimum distance for beginning the final leg of the landing approach that it is virtually impossible for him to discern a change in light displacement to correspond with the change actually made in the altitude of his plane. The display gain, i.e. the ratio of the observed error to actual error, is thus often inadequate for proper corrective measures at a distance great enough to insure safe landing.

The present invention is an improved optical guidance system. Here a plurality of colums of light cells focused to real images are utilized in addition to the virtual imaged cells of the column retained from the presently used guidance system. The effect of having virtual imaged objects in juxtaposition with real imaged objects is that the indication presented to the vehicle of its deviation from the guide path is represented by light moving in two directions away from the line of zero error indication. This double movement affords an indication two times the amplitude of the indication provided by the presently used Fresnel lens system at a given range. Thus by replacing the static datum reference lights of the presently used Fresnel lens system with dynamic light columns, which may be of a different color from the light of the original column, an alignment of the lights of this multiple column unit indicates the desired guide path, while deviation from that path is indicated not only by the codirectional movement of the light of the original column, an added measure of indication is provided by the contra-directional movement of the auxiliary light columns without loss of resolution of information, field of view or range of view.

It is accordingly an object of the present invention to provide a wholly dynamic optical guidance system.

Another object of the present invention is to provide a guidance system of improved sensitivity at a given range.

A further object is to provide an improved Fresnel lens guidance system having twice the range for a given sensitivity over present systems.

Other objects and advantages of the invention will become more fully apparent and better understood from the following description of an embodiment of the invention selected by way of example, as illustrated in the accompanying drawings, in which:

FIG. 2 illustrates the light display seen from a vehicle above the appropriate path;

FIG. 3 illustrates the offset angle of the cells of an auxiliary light unit; and FIG. 4 illustrates the offset angle of the cells of the main light unit.

Figure 1:
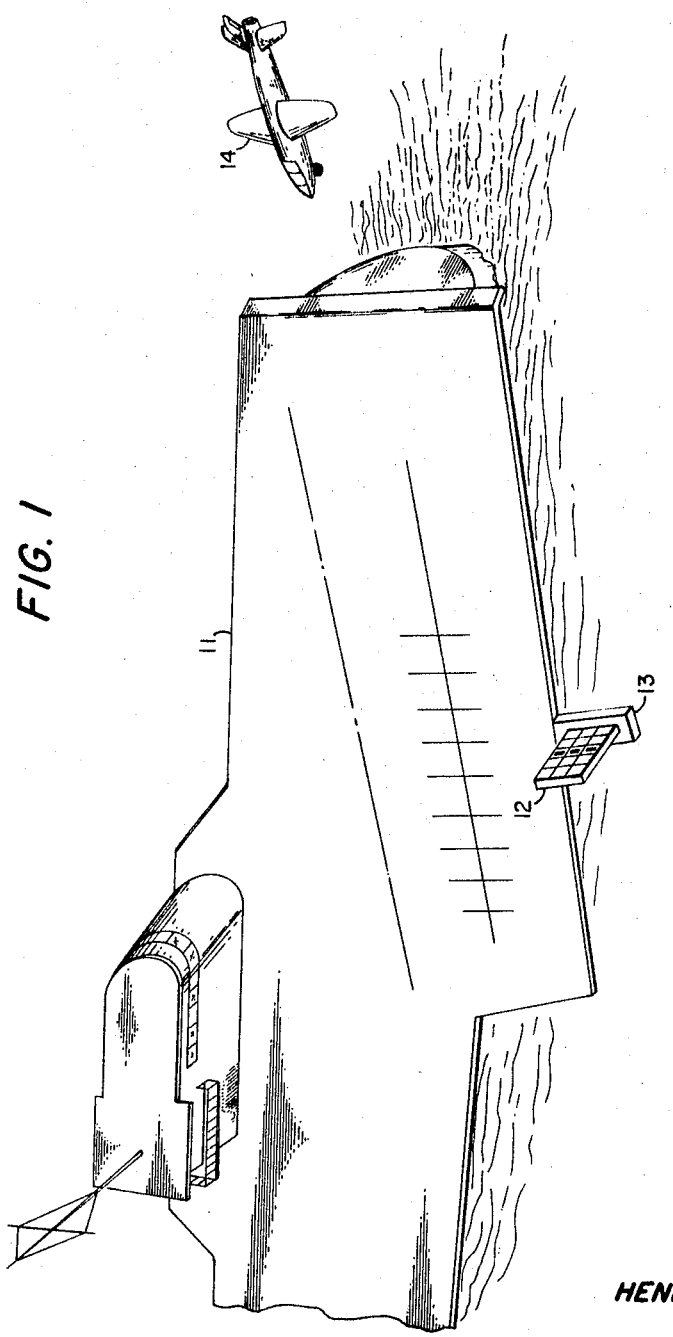
FIG. 1 is an illustration of a plane landing with the aid of the guidance system of the present invention.

Referring now to the drawings, wherein like reference characters designate like parts throughout, there is shown in FIG. 1 an optical guidance display 12 mounted on a stable platform 13, which in turn is affixed to the aircraft 11 upon which a plane 14 is about to land. It will be noted that the display indicates an on-glide-slope indication in the form of a light appearing in the centermost cell of each column.

FIG. 2 shows the array 12 providing an indication seen from a vehicle above the desired guide path. An on-guide-path indication, as noted in FIG. 1, is represented by an alignment of the lights of the columns 21, 22 and 23 at the centermost cell "c," generally indicated by the line 20. From an observation of the illustration of array 12 in both FIGS. 1 and 2, it will be noted that the lights of the auxiliary units 22 and 23 move in an opposite direction to the deviation of the vehicle from the desired path as indicated by lights 24 and 26 in cells "d," while the light 25 from column 21 is seen to move in the same direction as the vehicle's deviation from the desired path.

Referring now to FIGS. 3 and 4, there is shown a side view of column 22 in FIG. 3 and a side view of the column 21 in FIG. 4. Each of these figures show that a light cell, such as 22a, consists of a lens 31 and a light source designated O. These figures show also that each of the cells in a column are angularly offset such that the images of all the cells in a column are caused to coincide in a single image I or I'. The distinct difference between the showings of FIGS. 3 and 4 will be understood by a closer examination of the cell "a" in each figure. Each of the lenses in these cells has a focal point designated by length "f." The object (light source) in cell 22a is placed a short distance beyond the focal point while the object in cell 21a is placed a short distance in front of the focal point. The result of this difference in object placement is that the light cells of the column shown in FIG. 3 project a real image I in front of this column of lights, while column 21 shown in FIG. 4 projects a virtual image I' behind the display. The effect of this difference in focusing between light columns is that the single lights viewed from the vehicle to be guided which are projected by columns 22 and 23 appear to move contra-directional to the movement of the vehicle while the single light seen from light column 21 appears to move codirectional to the vehicle's movement. With each of the cells of a column in the display angularly offset from each other so that the images of the cells coincide, a single continuously visible freely movable light will be seen from each column, even though all the lights in the display are on during guidance.

If each light source in the display were to be located at the focal point of its associated lens, the light rays would not converge as shown in FIG. 4, but would converge at optical infinity so that parallel rays of light would eminate from each cell. This is undesirable because of the extreme narrowness of field thus occasioned.

A small deviation in the placement of the light source from the focal point results in the more realistic and practical points of ray convergence shown in FIGS. 3 and 4, which, for example, can be the 150 feet image distance of the Fresnel lens guidance systems presently used by the Navy for carrier landing. For the purpose of symmetry the light sources in the cells of columns 22 and 23 have been placed at appropriate distances behind the focal point such that the points of image convergence is the same distance in front of the display as the lights of the center column are focused behind the display.

It should be noted that the actual rays of light which can be seen from the vehicle guided are shown in solid lines in FIGS. 3 and 4, while those lines indicating the virtual image of the cells of column 21 are shown in phantom lines. Although a simple convex lens is shown in these figures, Fresnel lenses because of their small diameter-high focusing characteristic are preferred. Also, while the change in the image from virtual to real or vice versa has been described as a function of the placement of the object, the result desired may be brought about by altering the focal length of the lenses.

The lights shown in display 12 in FIGS. 1 and 2 are depicted as bars 24, 25 and 26. Since the shape of the indication presented is a matter of choice, bars of light have been chosen because of the greater tendency for the on-guide-path indication to be represented as a collinear indication, and thus more easily recognized.

In FIG. 2 the indication shown would be seen by a vehicle above the desired path 20. Because of the virtual image presented by column 21, the light of this column directly indicates the deviation of the vehicle from the desired path, while because of the real images displayed by columns 22 and 23, these lights appear to move in a direction opposite to the deviation of the vehicle from the optimum path. Thus the replacement of the datum lights shown in the aforementioned Ogle patent with dynamic light columns greatly improves the amplitude of the indication of a vehicle's error from the guide path. The amplitude of the indication of deviation from the optimum path has indeed been increased by a factor of two over the systems of the prior art at a given range. This is because the display of the present invention has a double displacement, i.e. both above and below the reference path to indicate the vehicle's deviation from this path. Or, if range is not held constant for the purpose of comparison, the greater amplitude indication is visible at twice the range over that of presently used systems.

The principles of the present invention, which have been described by way of illustration in the embodiment of a three columned light array, may be more generally described as a plurality of clusters of light cells, the various lights within particular clusters being focused to present real images and the lights of the remainder of clusters being focused to present virtual images. The cells of each cluster are mechanically positioned to present a single image from each cluster and the various clusters are in close proximity to each other so that those presenting real images may be readily related to those presenting virtual images. By color coding the different image types and instructing the operator to control his vehicle so that the different colored images are brought into alignment, the guidance of the vehicle is made complete. It is thus to be understood that not only the number of clusters of light cells may be varied, the cells within a cluster may vary as indeed may the disposition of the array itself to accommodate various vehicle types to be guided. So too, the datum lights of the prior art systems need not be done away with but can be retained for the purpose of indicating to an aircraft being guided, for example, its roll attitude relative to the landing area. The principles of operation are thus not limited to three light units, clusters or columns as they have been variously referred to, but may be carried out with as few as two of these units or as many as is practical for the guidance problem at hand.

Since various changes and modifications may be made in the practice in the invention herein described without department from the spirit or scope thereof, it is intended that the foregoing description shall be taken primarily by way of illustration and not in limitation except as may be required by the appended claims.

What is claimed and desired to be secured by Letters Patent of the United States is:

1. An improved optical guidance system providing optimum path and error from optimum path indication, comprising:
   a plurality of clusters of light cells, each cluster being capable of presenting an indication of error to a vehicle to be guided independent from the other said clusters of light cells;
   each of the cells of said clusters having a light source and a lens;
   the lights of at least one of said clusters of light cells being focused by said lenses to form virtual images, such that said error indication is codirectional with said vehicle's error;
   the lights of the other of said clusters of light cells being focused to form real images, such that said error indication is contra-directional to said vehicle's error;
   said clusters of light cells being arranged in a predetermined array to present both said codirectional and said contra-directional indications to said vehicle in juxtaposition, such that the error indication to said vehicle at a given range presented by said array is twice the amplitude of the indication presented by one of said clusters and as the vehicle's error from said optimum path is brought to zero, said codirectional and contra-directional indications are observed to aproach a predetermined representation indicating said optimum path.

2. An improved optical guidance system as recited in claim 1, wherein said clusters are columns of light cells.

3. An improved optical guidance system as recited in claim 2, wherein said array includes a plurality of said columns in juxaposition, those columns presenting a co-directional indication alternating with those columns presenting a contra-directional indication.

4. An improved optical guidance system as recited in claim 3, wherein the light cells of each column are angularly offset from each other such that the images of the cells converge and a single light from each column is continuously observed from said vehicle being guided.

5. An improved optical guidance system as recited in claim 4, wherein the same one of said light cells in each of said columns indicates said optimum path, which indication is viewed from a vehicle in that path as the convergence of the oppositely moving lights of said columns into a collinear display.

6. An improved optical guidance system as recited in claim 5, wherein said same one light cell in each column which indicates said optimum path is the centermost cell.

7. An improved vehicle guidance system providing optimum path and deviation from optimum path indication, comprising:
   an array of columns of light cells, each column presenting an indication to a vehicle to be guided of its deviation from said optimum path independent from the other of said columns, and the columns of said array together providing an indication of said optimum path;
   each of said columns containing a plurality of light cells, said light cells each including a focusing lens and a light source;
   the light cells in at least one of said columns being focused to present virtual images of said light sources, such that said indication of deviation by such columns is codirectional with said vehicle's deviation;

the light cells in the other of said columns of light cells being focused to present real images of said light sources, such that said indication of deviation by such columns is contra-directional to said vehicle's deviation;

the light cells in each column being angularly offset from each other, such that the images of said light sources converge and a single light from each column is observed from said vehicle;

said columns presenting a contra-directional indication being in juxtaposition to and alternating with the columns presenting a codirectional indication, such that the deviation indication to said vehicle at a given range presented by said array is twice the amplitude of the indication presented by any one column, and as the vehicle's deviation from said optimum path is corrected to lessen the amplitude of the indication observed, the individual indications of the columns in said light array will be seen to converge in a collinear presentation indicating said optimum path.

8. An improved vehicle guidance system as recited in claim 7, wherein the centermost light cell in each column represents said optimum guide path, which centermost cells are viewed from the vehicle on that path as a collinear presentation due to the convergence of the images of the lights of each column.

9. A vehicle guidance system providing optimum path and error from optimum path indication, comprising:

first error indicating means providing a codirectional indication of said vehicle's deviation from said optimum path;

second error indicating means providing a contra-directional indication of said vehicle's deviation from said optimum path;

said first and second indicating means being alternately combined in juxtaposition to form an array;

said array thereby providing an indication of error twice the amplitude of the indication provided by either of said error indicating means.

No references cited.

NEIL C. READ, *Primary Examiner.*

A. H. WARING, *Assistant Examiner.*